United States Patent
Lévêque et al.

(10) Patent No.: US 8,250,241 B1
(45) Date of Patent: Aug. 21, 2012

(54) INTELLIGENT CACHING OF MEDIA FILES

(75) Inventors: Xavier Lévêque, Laval (CA); Richard Elliott Norton, Ste-Genevieve (CA); Joseph Leo Claude Mario Lavalliere, Mascouche (CA)

(73) Assignee: Vantrix Corporation, Montreal (CA)

( * ) Notice: Subject to any disclaimer, the term of this patent is extended or adjusted under 35 U.S.C. 154(b) by 0 days.

(21) Appl. No.: 13/452,852

(22) Filed: Apr. 21, 2012

Related U.S. Application Data

(63) Continuation of application No. 12/114,798, filed on May 4, 2008, now Pat. No. 8,171,167.

(60) Provisional application No. 60/987,460, filed on Nov. 13, 2007.

(51) Int. Cl.
G06F 15/16 (2006.01)
(52) U.S. Cl. ........................ 709/246; 707/610; 709/214
(58) Field of Classification Search ................... 709/218, 709/462
See application file for complete search history.

(56) References Cited

U.S. PATENT DOCUMENTS

| | | | |
|---|---|---|---|
| 6,785,732 B1 | 8/2004 | Bates et al. | |
| 6,813,690 B1 | 11/2004 | Lango | |
| 6,888,477 B2 | 5/2005 | Lai et al. | |
| 6,970,602 B1 | 11/2005 | Smith | |
| 7,010,581 B2 * | 3/2006 | Brown et al. | 709/218 |
| 7,475,106 B2 | 1/2009 | Agnoli | |
| 7,549,052 B2 | 6/2009 | Haitsma | |
| 7,577,848 B2 | 8/2009 | Schwartz | |
| 7,640,274 B2 | 12/2009 | Tinker | |
| 7,692,666 B1 | 4/2010 | Bourgoin et al. | |
| 7,876,766 B1 | 1/2011 | Atkins et al. | |
| 7,890,619 B2 | 2/2011 | Morota et al. | |
| 2002/0103972 A1 | 8/2002 | Satran | |
| 2003/0097564 A1 | 5/2003 | Tewari | |
| 2004/0001106 A1 | 1/2004 | Deutscher | |
| 2004/0268224 A1 | 12/2004 | Balkus | |
| 2005/0187756 A1 | 8/2005 | Montgomery | |
| 2006/0029192 A1 | 2/2006 | Duddley et al. | |
| 2006/0161538 A1 * | 7/2006 | Kiilerich | 707/4 |
| 2006/0242550 A1 | 10/2006 | Rahman | |

(Continued)

OTHER PUBLICATIONS

Coskun, Baris, Sankur, Bulent "Robust Video Hash Extraction" article available at <citeseerx.ist.psu.edu/viewdoc/download-?doi=10.1.1.113.9934.pdf> European Signal Processing Conference EUSIPCO 2004.

(Continued)

*Primary Examiner* — Patrice Winder
*Assistant Examiner* — Tauqir Hussain
(74) *Attorney, Agent, or Firm* — IP-MEX Inc.; Victoria Donnelly

(57) ABSTRACT

A method of receiving and forwarding a multimedia message is provided. The multimedia message is adapted with a first adaptation profile into a first adapted message to be received in a first device. The multimedia message and the first adapted message are stored in a media cache. The message may then be forwarded from the first device to a second device that has a second adaptation profile by retrieving the first adapted message from the media cache and sending it to the second device if the first and second adaptation profiles match, otherwise the multimedia message is retrieved from the media cache and adapted with the second adaptation profile into a second adapted message that is then sent to the second device. In addition, the second adapted message is stored in the media cache. A corresponding system for processing and forwarding the multimedia message is also provided.

20 Claims, 9 Drawing Sheets

U.S. PATENT DOCUMENTS

| | | | |
|---|---|---|---|
| 2007/0011256 | A1 | 1/2007 | Klein |
| 2007/0067390 | A1 | 3/2007 | Agnoli et al. |
| 2008/0001791 | A1 | 1/2008 | Wanigasekara-Mohotti et al. |
| 2008/0140720 | A1 | 6/2008 | Six et al. |
| 2008/0196076 | A1 | 8/2008 | Shatz et al. |
| 2008/0201386 | A1* | 8/2008 | Maharajh et al. ............. 707/201 |
| 2008/0226173 | A1 | 9/2008 | Yuan |
| 2008/0229429 | A1 | 9/2008 | Krig |
| 2009/0067357 | A1 | 3/2009 | Norton |
| 2009/0088191 | A1 | 4/2009 | Norton |
| 2009/0125677 | A1 | 5/2009 | Norton et al. |
| 2009/0280844 | A1 | 11/2009 | Norton |
| 2010/0114816 | A1* | 5/2010 | Kiilerich ...................... 707/610 |
| 2010/0153495 | A1* | 6/2010 | Barger et al. ................. 709/203 |

OTHER PUBLICATIONS

OMA Multimedia Messaging Service, Architecture Overview, Approved Version 1.2 01, published by Open Mobile Alliance, available from http://www.openmobilealliance.org/release_program/mms_v1_2.html, Mar. 2005.

Open Mobile Alliance document OMA-AD-STI-V1_0-20270515-A "Architecture of the Environment using the Standard Transcoding Interface" Approved Version 1.0-15, published by Open Mobile Alliance, May 2007.

3GPP TS 26.140 V7.1.0, Technical Specification 3rd Generation Partnership Project;Technical Specification Group Services and System Aspects; Multimedia Messaging Service (MMS); Media formats and codecs (Release 7) available from http://www.3gpp.org/ftp/Specs/html-info/26140.htm, Jun. 6, 2007.

Relational Database System (RDBS), available from http://www.mysql.org/ published by Sun Microsystems, available prior to Nov. 12, 2007.

Request for Comments (RFC)1321 "The MD5 Message-Digest Algorithm", R. Revest, available from http://tools.ietf.org/html/rfc1321 published by IEFT (Internet Engineering Task Force) Apr. 1992.

MM1, MM3, MM4, MM7 are defined by the 3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip), Nov. 6, 2006.

"Internet Content Adaptation Protocol (ICAP)" J. Elson, Request for Comments (RFC) 3597 available from http://www.ietf.org/rfc/rfc3507.txt, Apr. 2003.

Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_App_Interface_FAQ.pdf.html published by Nokia, prior to Nov. 12, 2007.

Synchronized Multimedia Integration Language (SMIL) 1.0 Specification, published by W3C organization at http://www.w3.org/TR/REC-smil Jun. 15, 1998.

Tayeb Lemlouma, Nabil Layaida "Encoding Multimedia Presentations for User Preferences and Limited Environments" Proceedings of IEEE International Conference on Maultimedia &Expo (ICME), IEEE Computer Society, 2003, p. 165-168.

Multimedia Messaging Service, Media Formats and Codecs 3GPP TS 26.140, V 7.1.0, http://www.3gpp.org/ftp/specs/html-info/26140.htm, Jun. 2007, p. 13.

S.Coulombe et al., Multimedia Adaptation for the Multimedia Messaging Service, IEEE Communication Magazine, vol. 42, No. 7, p. 120-126, Jul. 2004.

3GPP in 3GPP TS 23.140 V6.14.0 (Nov. 6, 2006), Technical Specification 3rd Generation Partnership Project, Technical Specification Group Core Network and Terminals, Multimedia Messaging Service (MMS), Functional description, Stage 2 (Release 6), http://www.3gpp.org/ftp/Specs/html-info/23140.htm (document http://www.3gpp.org/FTP/Specs/archive/23_series/23.140/23140-6e0.zip).

Xing Su, Tiejun Huang, Wen Gao, "Robust Video Fingerprinting Based on Visual Attention Regions", IEEE International Conference on Acoustics Speech and Signal Processing, available on internet at <http://www.jdl.ac.cn/doc/2009/ROBUST%20VIDE0%20FINGERPRINTING%20BASED%20ON%20VISUAL%20ATTENTION%20REGIONS.pdf>, Apr. 19-24, 2009.

Matthijs Douze, Herv'e J'egou and Cordelia Schmid, "An Image-Based Approach to Video Copy Detection with Spatio-Temporal Post-Filtering" IEEE Transactions on Multimedia, No. 4, pp. 257-266, available on the internet at <http://lear.inrialpes.fr/pubs/2010/DJS!)/douze_tmm.pdf>, 2010.

JPEG—Wikipedia, the free encyclopedia, http://en.wikipedia.org/wiki/JPEG, Aug. 5, 2007.

Advanced Audio Coding—Wikipedia, the free encyclopedia, http://en.wikipedia.org/wiki/Advanced_Audio_Coding, Aug. 5, 2010.

Synchronized Media Integration Language (SMIL) 2.0 Specification W3C Recommendation http://www.w3.org/TR/smil20/, Aug. 7, 2001.

"The independent JPEG Group" ftp.uu.net/graphics/jpeg/jpegsrc.v6b.tar.gz, Aug. 3, 2007.

International Search Report and Written Opinion rendered by Canadian Intellectual Property Office, dated Sep. 30, 2008.

* cited by examiner

INTELLIGENT CACHING OF MEDIA FILES

RELATED APPLICATIONS

The present application is a Continuation of U.S. patent application Ser. No. 12/114,798 filed on May 4, 2008, which has now issued into a U.S. Pat. No. 8,171,167 on May 1, 2012, which claims benefit from the U.S. provisional application Ser. No. 60/987,460 to LÉVÈQUE, Xavier, entitled "Intelligent Caching of Media Files" filed on Nov. 13, 2007, entire contents of the applications and the issued patent being incorporated herein by reference.

FIELD OF THE INVENTION

The present invention relates to the adaptation and forwarding of multimedia files, specifically the caching of previously forwarded files and adapted files.

BACKGROUND OF THE INVENTION

The multimedia messaging service (MMS) provides methods for the peer-to-peer and server-to-client transmission of various types of data including text, audio, still images, and moving images, primarily over wireless networks, see, for example, Open Mobile Alliance (OMA) Multimedia Messaging Service, Architecture Overview, Approved Version 1.2 1 Mar. 2005, available from http://www.openmobilealliance-.org/release_program/mms_v1_2.html.

While the MMS provides standard methods for encapsulating such data, the type of data may be coded in any of a large number of standard formats such as plain text, 3GP video and audio/speech, SP-MIDI for synthetic audio, JPEG still images. For details on any one of those standards, please refer to "Multimedia Messaging Service", published by Media formats and codecs, 3GPP TS 26.140, V7.1.0 (2007-06), available from http://www.3gpp.org/ftp/Specs/html-info/26140.htm.

FIG. 1 illustrates one example of an MMS system architecture 100, including an Originating Node 102, a Service Delivery Platform 104, a Destination Node "I" 106, and an Adaptation Engine 108. The Originating Node 102 is able to communicate with the Service Delivery Platform 104 over a Network "A" 110. Similarly, the Destination Node "I" 106 is able to communicate with the Service Delivery Platform 104 over a Network "B" 112. The Networks "A" and "B" are merely examples, shown to illustrate a possible set of connectivities, and many other configurations are also possible. For example, the Originating Node 102 and the Destination Node "I" 106 may be able to communicate with the Service Delivery Platform 104 over a single network; the Originating Node 102 may be directly connected to the Service Delivery Platform 104 without an intervening network, etc.

The Adaptation Engine 108 may be directly connected with the Service Delivery Platform 104 over a link 114 as shown in FIG. 1, or alternatively, may be connected to it through a network, or may be embedded in the Service Delivery Platform 104.

In a trivial case, the Originating Node 102 may send a multimedia message that is destined for the Destination Node "I" 106. The message is forwarded through the Network "A" 110 to the Service Delivery Platform 104 from which the message is sent to the Destination Node "I" 106 via the Network "B" 112. The Originating Node 102 and the Destination Node "I" 106 may for instance be wireless devices, the Networks "A" and "B" (110 and 112) may in this case be wireless networks, and the Service Delivery Platform 104 may provide the multimedia message forwarding service.

In another instance, the Originating Node 102 may be a server of a content provider, connected to the Service Delivery Platform 104 through a data network, i.e. the Network "A" 110 may be the Internet, while the Network "B" 112 may be a wireless network serving the Destination Node "I" 106 which may be a wireless device.

In a more general case, the capabilities of the Destination Node "I" 106 may not include the ability to receive, decode, or display the message in the form in which it was sent from the Originating Node 102. In order for the Destination Node "I" 106 to handle the message, the message received from the Originating Node 102 may be modified in the Adaptation Engine 108 before being delivered to the Destination Node "I" 106.

A "Standard Coding Interface" (STI) proposed by the "Open Mobile Alliance" provides a framework for standardizing an approach to message adaptation for the MMS in "Architecture of the Environment using the Standard Transcoding Interface" as described in the Open Mobile Alliance document OMA-AD-STI-V1_0-20270515-A "Architecture of the Environment using the Standard Transcoding Interface" Approved Version 1.0 dated 15 May 2007.

In the example configuration of FIG. 1, transmission of a message from the Originating Node 102 to the Destination Node "I" 106 would involve the following five steps, assuming that message adaptation is required:

Step 1:
  a "source message" is sent from the Originating Node 102 to the Service Delivery Platform 104;

Step 2:
  the Service Delivery Platform 104 determines the capabilities of the Destination Node "I" 106, for example by interrogating the Destination Node "I" 106 directly or by consulting a database of capabilities;

Step 3:
  the Service Delivery Platform 104 sends a request to the Adaptation Engine 108, the request including the original "source message", and a description of the capabilities of the Destination Node "I" 106;

Step 4:
  the Adaptation Engine 108 performs the adaptation of the "source message" into an "adapted message"; and Step 5:
  the Adaptation Engine 108 returns the "adapted message" to the Service Delivery Platform 104 which forwards it to the Destination Node "I" 106.

In addition to adapting a message based on the capabilities of a destination node, the Adaptation Engine 108 may also perform additional processing on the message.

FIG. 2 illustrates one example of an expanded MMS system architecture 200, including the MMS system architecture 100, augmented with an additional Network "C" (116), connecting a second Destination Node "II" (118) with the Service Delivery Platform 104.

As in the MMS system architecture 100 described above, a source message from the Originating Node 102 may be adapted in the adaptation engine 108 into an adapted message before being sent to the Destination Node "I" 106, and a second adapted message may be sent to the Destination Node "II" 118, where the second adapted message may be independently adapted depending on the capabilities of the Destination Node "II" 118.

In another example, it may be desired to forward a message received in the Destination Node "I" 106 to the Destination Node "II" 118. If the capabilities of the two destination nodes differ, the forwarded message may have to be adapted again. If the original source message had been adapted first to the capabilities of the Destination Node "I" 106, it may have lost in quality which cannot be regained when the message is subsequently forwarded to the Destination Node "II" 118 even though the Destination Node "II" 118 may have higher capabilities that would have enabled it to receive the original source message without loss of quality, for example.

In another example, the Destination Node "I" 106 may modify a multimedia source message before forwarding it to the Destination Node "II" 118. In this case, it may be inconvenient or impossible to retain some original content in the forwarded message.

In yet another example, a source message may be directed to two or more destinations. While the present systems allow the message to be adapted according to the capabilities of each destination, some unnecessary adaptations may be perform when some destinations have equal or compatible capabilities.

To overcome these and other deficiencies of the prior art, there remains a requirement for developing systems and methods that would allow messages to be more efficiently forwarded or broadcast to other destinations, and without loss of quality where this is possible.

SUMMARY OF THE INVENTION

There is an object of the invention to provide an improved method and system for the adaptation and forwarding of multimedia files, using an intelligent caching of media files.

According to one aspect of the invention, there is provided a method of sending a source media file of a multimedia message from a service center to a first and second devices via one or more adaptation servers, at least one of the servers having a media cache, the method comprising the steps of:
(a) computing a signature of the source media file;
(b) using the signature of the source media file as index for locating an original copy of the source media file in the media cache;
(c) locating a first adapted version of the original copy of the source media file in the media cache;
(d) sending the first adapted version to the first device;
(e) locating the second adapted version of the original copy of the source media file in the media cache; and
(f) sending the second adapted version to the second device.

The step (c) comprises performing adaptation of the original copy of the source media file into the first adapted version if the locating of the first adapted version has not been successful.

Beneficially, the step (c) further comprises:
computing a signature of the first adapted version; and
using the signature of the first adapted version as index for storing the first adapted version in the media cache.

The step (c) further comprises storing the source media file in the media cache as the original copy, and transcoding the source media file into the first adapted version if the locating of the original copy of the source media file in the step (b) has not been successful.

Conveniently, the step (c) further comprises:
computing a signature of the first adapted version; and
using the signature of the first adapted version as index for storing the first adapted version in the media cache.

The step (e) comprises performing adaptation of the original copy of the source media file into the second adapted version if the locating of the second adapted version has not been successful.

The step (e) further comprises storing the source media file in the media cache as the original copy, and transcoding the source media file into the second adapted version if the locating of the original copy of the source media file in the step (b) has not been successful.

Conveniently, the step (e) further comprises:
computing a signature of the second adapted version; and
using the signature of the second adapted version as index for storing the second adapted version in the media cache.

Advantageously, the method further comprises the steps of:
determining capabilities of the first and second devices; and
locating first and second adapted versions that are compatible with the capabilities of the first and second devices respectively.

According to another aspect of the invention, there is provided a media cache system for intelligent caching of a plurality of original and adapted versions of media files, the system comprising:
a media files repository, containing original versions and adapted versions of media files, in which each adapted version is adapted from one of the plurality of original versions according to one of a plurality of transcoding profiles;
a signatures repository, containing signatures of the original versions and the adapted versions; and
a database engine, comprising a computer readable software program code means stored in a computer readable medium to be executed by a processor, for providing access to the media files repository, to signatures repositories, and to links carrying multimedia messages to be cached by the media cache system; and for keeping track of the original versions and the adapted versions by maintaining index schemas based on the signatures of the respective media files.

In the media cache system, the signatures are generated in the processor, by computing a digest function over each said media file, for example, a standard Message Digest 5 (MD5) function.

In the media cache system, the plurality of transcoding profiles includes transcoding profiles for at least one type of device capable of receiving media files.

According to yet another aspect of the invention, there is provided an adaptation server for adapting source media files, received over a link, into adapted versions according to the capabilities of destination devices, including:
a processor for performing the adapting; and
a media cache for intelligent caching of a plurality of original and adapted versions of media files, the media cache including:
a media files repository, containing original versions and adapted versions of media files, in which each adapted version is adapted from one of the plurality of original versions according to one of a plurality of transcoding profiles;
a signatures repository, containing signatures of the original versions and the adapted versions; and
a database engine, comprising a computer readable software program code means stored in a computer readable medium to be executed by a processor, for providing access to the media files repository, to signatures repositories, and to links carrying multimedia messages to be cached by the media cache system; and for keeping track of the original versions and the adapted versions by maintaining index schemas based on the signatures of the respective media files.

According to one more aspect of the invention, there is provided a method for forwarding an original multimedia message from a first device to a second device, each device being characterized by a transcoding profile, through an adaptation server having a media cache, comprising the steps of:
- (a) receiving the original multimedia message from a service center;
- (b) transcoding the original message into a first adapted message in accordance with a first transcoding profile;
- (c) sending the first adapted message to the first device;
- (d) storing the original multimedia message in the media cache;
- (e) storing the first adapted message, and the first transcoding profile in the media cache;
- (f) receiving the first adapted message from the first device;
- (g) generating a second adapted message; and
- (h) sending the second adapted message to the second device.

In the method described above, the step (f) further includes locating the first transcoding profile, the first adapted message and the stored original message stored in the media cache; and the step (g) further includes verifying that the first and a second transcoding profiles are identical, and copying the first adapted message to generate the second adapted message instead of transcoding, otherwise, verifying that the first and a second transcoding profiles are not identical, and transcoding the original message into the second adapted message in accordance with the second transcoding profile.

Conveniently, the step (g) further includes:
determining added elements of the received first adapted message compared with the original multimedia message stored in the media cache, and
transcoding a combination of the original multimedia message augmented by the added elements into the second adapted message.

In the method described above:
the step (d) further includes computing and storing a signature of the original multimedia message;
the step (e) further includes computing and storing signatures of the first adapted message and of the first transcoding profile; and
the step (f) further includes using the stored signatures in locating the first transcoding profile, the first adapted message and the stored original message.

According to one more aspect of the invention, there is provided a method for forwarding an original message from a first device to a second device through an adaptation server having a media cache, comprising the steps of:
- (a) receiving the original message from a service center;
- (b) transcoding media file components of the original message into a first adapted message in accordance with a first transcoding profile;
- (c) sending the first adapted message to the first device;
- (d) storing the media file components of the original message and signatures of the media file components in the media cache;
- (e) storing the first adapted message and the first transcoding profile in the media cache;
- (f) receiving the first adapted message from the first device;
- (g) generating a second adapted message; and
- (h) sending the second adapted message to the second device.

Beneficially,
the step (f) further includes locating the first transcoding profile, the first adapted message and the stored original message stored in the media cache; and
the step (g) further includes:
verifying that the first and a second transcoding profiles are identical, and copying the first adapted message to generate the second adapted message instead of transcoding;
otherwise, verifying that the first and a second transcoding profiles are not identical, and transcoding the original message into the second adapted message in accordance with the second transcoding profile.

Conveniently,
the step (d) further includes computing and storing signatures of the media file components of the original message;
the step (e) further includes computing and storing signatures of the first adapted message and of the first transcoding profile; and
the step (f) further includes using the stored signatures in locating the first transcoding profile, the first adapted message and the media file components of the stored original message.

According to one more aspect of the invention, there is provided a method for adapting an original media file into adapted media files, and sending an appropriate one of said adapted media files to each of a plurality of devices, comprising the steps of:
- (a) receiving the original media file from a service center;
- (b) storing the original media file in the media cache;
- (c) determining a transcoding profile for the first device;
- (d) locating an adapted media file corresponding to the original media file according to said transcoding profile in a media cache;
otherwise transcoding the original media file into the adapted media file with said transcoding profile and storing it in the media cache;
- (e) sending the adapted media file to the first device; and
- (f) repeating the steps (c) to (e) for each of the devices.

The steps (b), (c) (d) comprise computing respective signatures of the original media file, the adapted media file, and the transcoding profiles; and
using the computed signatures as indices for storing and retrieving the original media file, the adapted media file, and the transcoding profiles respectively.

According to yet one more aspect of the invention, there is provided a method of sending a multimedia message from a first device to a second device, comprising the steps of:
receiving the multi-media message in the first device having a first adaptation profile; and
forwarding the multi-media message from the first device to the second device having a second adaptation profile;
wherein the step of receiving comprises:
adapting with the multimedia message into a first adapted message according to the first adaptation profile;
sending the first adapted message to the first device; and
storing the multimedia message and the first adapted message in a media cache; and wherein the step of forwarding comprises:
retrieving the first adapted message from the media cache and sending it to the second device provided the first and second adaptation profiles match; otherwise:
retrieving the multimedia message from the media cache;
adapting the retrieved multi-media message into a second adapted message according to the second adaptation profile;

sending the second adapted message to the second device, and storing the second adapted message in the media cache.

BRIEF DESCRIPTION OF THE DRAWINGS

An embodiment of the invention will now be described, by way of example, with reference to the accompanying drawings in which.

DETAILED DESCRIPTION OF THE EMBODIMENTS OF THE INVENTION

To overcome the above stated deficiencies, a centralized media cache is introduced for caching both original and adapted messages. This will permit the forwarding of a message without loss of quality or information, even if the original message had to be adapted (and for example reduced in size and resolution) to meet the requirements of the device of the first recipient of the message (a first device). In addition to providing other advantages, it is an objective of the invention to enable the recipient of a forwarded message to receive a freshly adapted message, based on the original message, rather than based on the adapted message that was actually received by the first recipient. This is especially important when the capabilities of the device displaying the forwarded message (a second device) exceed those of the first device.

Figure 1:
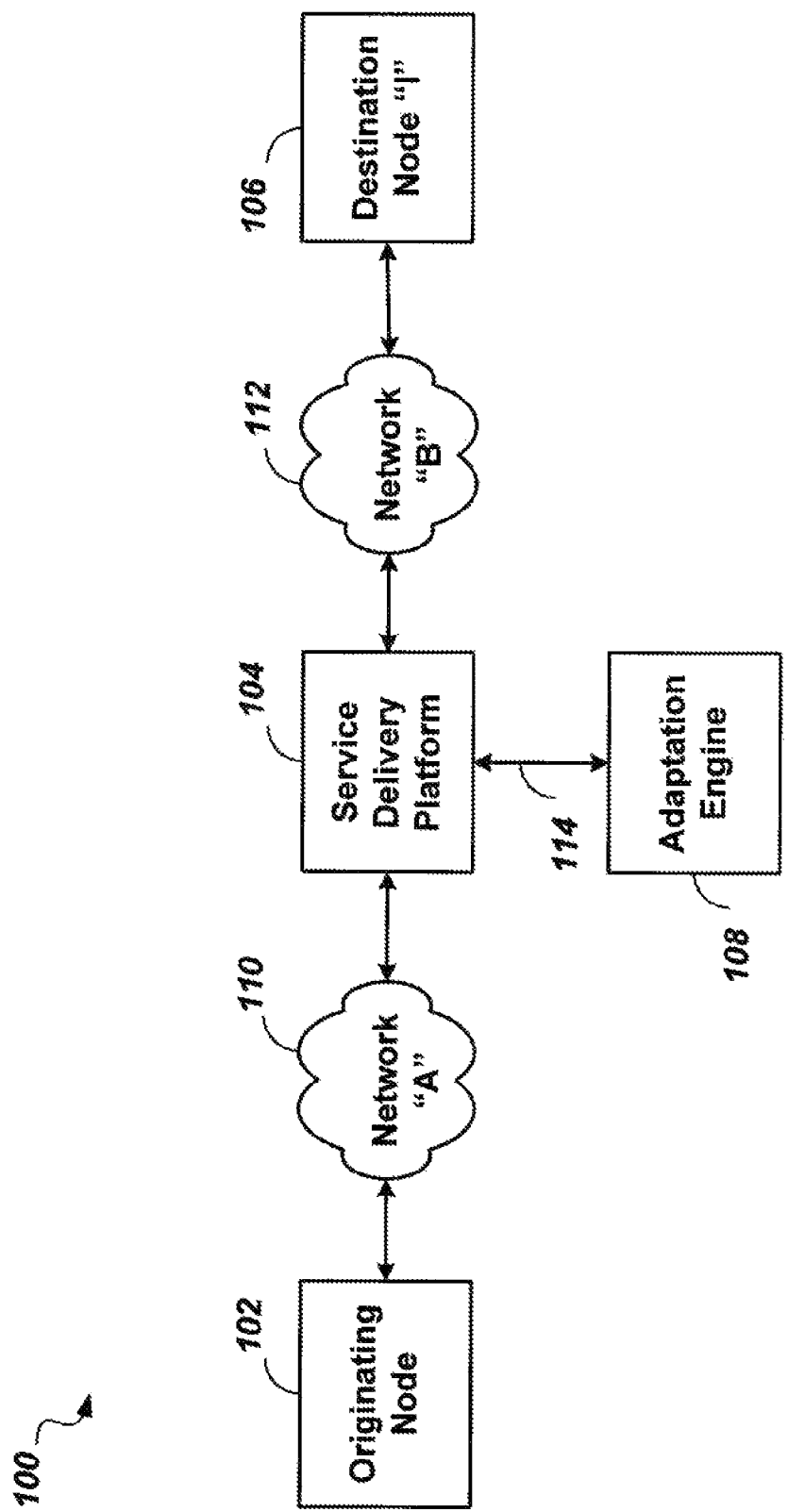
FIG. 1 illustrates an example of an MMS system architecture 100 of the prior art.
Figure 2:
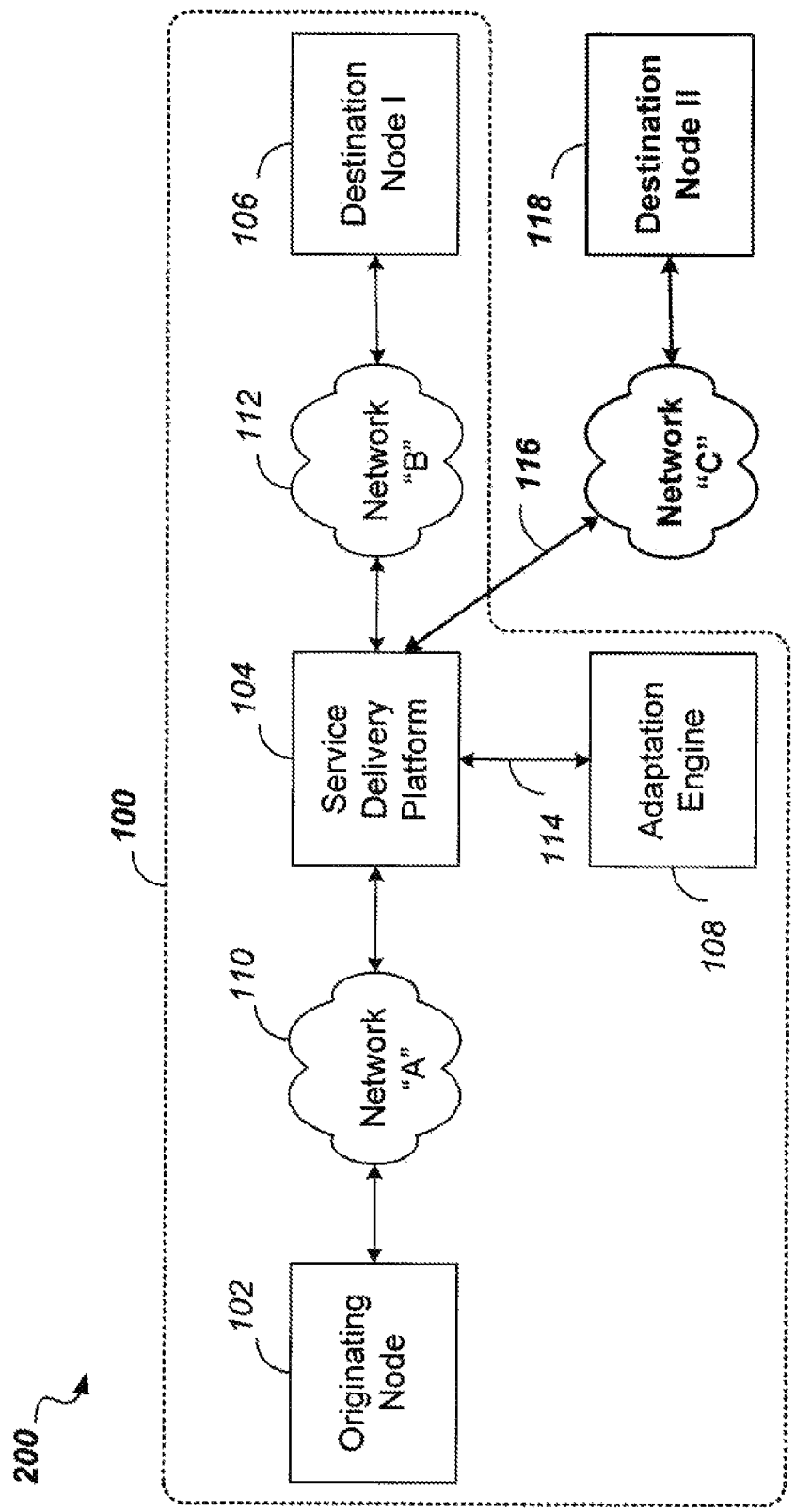
FIG. 2 illustrates an example of an expanded MMS system architecture 200 of the prior art, which includes the MMS system architecture 100.
Figure 3:
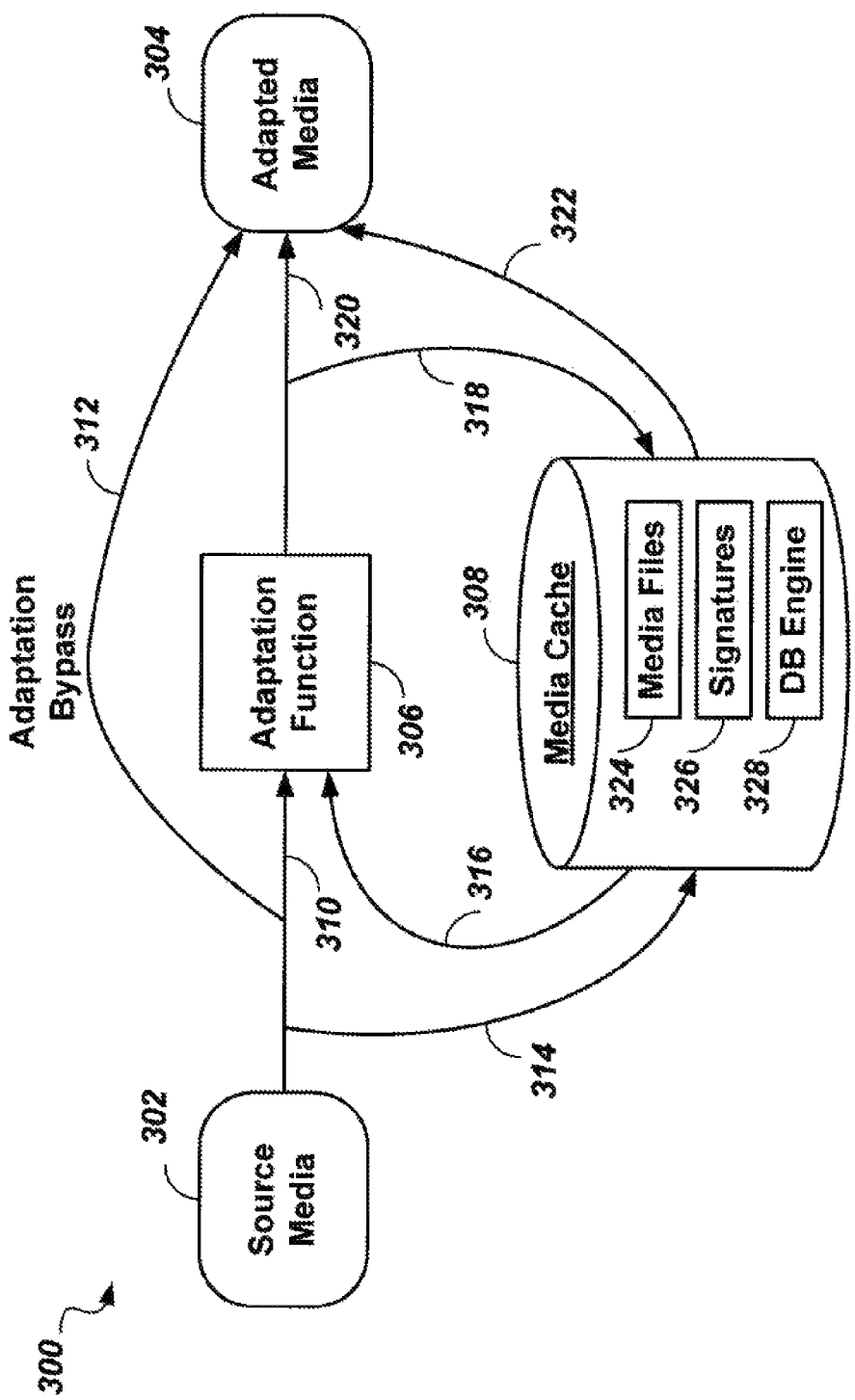
FIG. 3 shows an adaptation data flow diagram 300 of an embodiment of the present invention.

FIG. 3 shows an adaptation data flow diagram 300, including a Source Media 302, an Adapted Media 304, an Adaptation Function 306, and a Media Cache 308, indicating basic elements of an embodiment of the invention.

As indicated by 7 (seven) data flow arrows (data flows 310 to 322):

the Source Media 302 may be input to the Adaptation Function 306 (Source Media to Adaptation flow 310);

the Source Media 302 may be input to the Adapted Media 304 directly (Adaptation Bypass flow 312);

the Source Media 302 may be input to the Media Cache 308 (Source Media to Cache flow 314);

cached media may be sent from the Media Cache 308 to the Adaptation Function 306 (Cache to Adaptation flow 316);

adapted media may be sent from the Adaptation Function 306 to the Media Cache 308 (Adaptation to Cache flow 318);

adapted media may be sent from the Adaptation Function 306 to the Adapted Media 304 (Adaptation to Adapted Media flow 320); and cached media may be sent from Media Cache 308 to the Adapted Media 304 (Cache to Adapted Media flow 322).

In other words, the adaptation data flow diagram 300 illustrates the possible inputting of the Source Media 302 into the Adaptation Function 306 (the flow 310), and into the Media Cache 308 (the flow 314); and possibilities of obtaining the Adapted Media 304 directly from the Source Media 302 through the Adaptation Bypass flow 312, from the Adaptation Function 306 (the flow 320), or from the Media Cache 308 (the flow 322). The output of the Adaptation Function 306 may also be input into the Media Cache 308 (the flow 318). Furthermore, the Media Cache 308 may send media into the Adaptation Function 306 (the flow 316).

The Media Cache 308 includes a Media File Repository 324, a Signature Repository 326, and a Database Engine 328.

The Source Media 302 includes original media as well as forwarded media that may already have been adapted. The Adaptation Bypass flow 320 may serve to convey the Source Media 302 directly, without further adaptation, to become the Adapted Media 304.

The Adaptation Function 306 includes functionality to transcode the Source Media 302 into the Adapted Media 304 using a transcoding profile. The Adaptation Function 306 may further include the capability of filtering and disinfecting the media, and enhancing and transforming it.

The Media Cache 308 has the capability of storing and retrieving both original and adapted media files in the Media File Repository 324. Media files are, generally, the individual components of multimedia messages.

The media files are stored in the Media Cache 308 with signatures derived from the contents of the original media file and of the adapted media file, as well as signatures derived from the transcoding profiles and signatures derived from the enhancement or transformation parameters. The signatures are preferably generated from the data with a hashing algorithm such as defined in the Media Digest 5 (MD5) standard, described in Message Digest 5, specifications RFC 1321 available from http://tools.ietf.org/html/rfc1321. The signatures are stored in the Signature Repository 326 and are used as keys by the Database Engine 328 to permit the quick retrieval of the associated stored media files. By matching the stored signatures (keys) with the signatures of newly arrived Source Media 302, it is also possible to determine if an already adapted media file is present in the Media Cache 308, and also to find the original cached (source) media file that corresponds to a previously adapted media file. The Media Cache 308 may conveniently be implemented in a relational database management system (DBMS), for example MySQL (see Relational Database System (RDBS), available from http://www.mysql.org/), with disk storage for the Media File and Signature Repositories 324 and 326, and processing performed by the Database Engine 328.

The Media Cache 308 may also provide additional repositories for transcoding profiles, message processing ("enhancement") settings, and other data associated with multimedia message adaptation that may be advantageously cached, as required from time to time.

In addition, to the capability of retrieving individual media files and their associated data by their signatures (used as Database keys), the relational Database built into the Media Cache 308 permits associating and retrieving adapted media files through references (i.e. signatures) to their original version and transcoding profiles. For example, a list of previously adapted versions of a given original media file may be simply retrieved by a Database query. In a more complex query one may find first the given original media file to a specific received source media file, then obtain a list of previously adapted versions of this given original media file, and finally select from the list a specific previously adapted version whose transcoding profile matches a desired profile, thus locating the adapted version which may be required to satisfy the capabilities of a specific device.

The following examples of use cases #1 to #8 show applications of some of the functionality that is illustrated in the adaptation data flow diagram 300. These examples are merely illustrations of some of the uses of the invention, and should not be construed to limit the invention which may allow many other application scenarios, based the Media Cache 308 which is a powerful Database of media files indexed with file and data signatures that are used as Database keys.
The Use Cases #1 to #5 May be Applicable to all Types of Media:
Use Case #1—Basic Media Adaptation
In the basic case, a received media file (Source Media 302) is adapted in the Adaptation Function 306 for a specific destination device (data flows 310 and 320), where the Source Media 302 has not already been adapted for this type of device and thus is not available in the Media Cache 308. The Source Media 302 is thus adapted in the Adaptation Function 306 with the appropriate profile, into the Adapted Media 304. The Source Media 302 as well as the Adapted Media 304 are speculatively stored into the Media Cache 308 (data flows 314 and 318 respectively), for possible reuse later in another use case (e.g. Use Case #2).
Use Case #2—Media that has Already been Adapted with the Same Profile
In the case that a media file (the Source Media 302) has already been adapted for a specific device and stored in the Media Cache 308 and is thus available in the Media Cache 308; and a similar device requests the same media file, the Adapted Media 304 may be obtained from the Media Cache 308 without having to invoke the Adaptation Function 306.
Use Case #3—Bulk Media Sent
When a same media file is sent to multiple targets, it will be adapted only once per type of destination device. The adapted versions will be stored in the Media Cache 308 to be reused for other destinations using the same types of device. In implementation, this is equivalent to the use case #2 above.
Use Case #4—Media with a Reduced Quality Attachment is being Adapted for a Higher Quality Device
In the case where a media file (the Source Media 302) is a forwarded media file that had been adapted from the original because of the device capabilities of the forwarding phone, and the media file is forwarded to a destination device with higher capabilities, the original high quality media file may be retrieved in the Cache to Adaptation flow 316 from the Media Cache 308 and after adaptation in the Adaptation Function 306 sent as Adapted Media 304 to the destination device.
Use Case #5—Media Modified or Adapted Off-Net
In the case where a media file (the Source Media 302) is received that was adapted or modified in any way in another network, there will be no way to bind or correlate it again to previously adapted or original media file in the present network since its signature has obviously changed. In this case the modified source media file will now be considered as a new original media file.
Use Cases #6 to #8 are MMS-Specific
If the signature (for example an MD5 checksum), is calculated on the entire message (headers+body), it is very unlikely that there will ever be a cache hit on it because the date stamp and message identifier in the MMS header is unique. Thus, the signatures would need to be generated from the multi-part body of the message, i.e. only the data contained in the message body, without the MMS headers. Only the body (data) of the MMS message will be stored in the cache, the headers will have to be reconstructed separately when a cached media file is retrieved from the cache.
Use Case #6—Message has Already been Adapted
If an MMS message with zero or more attachments has already been adapted with the same profile, the adapted message body (without the main headers) can be retrieved from the Media Cache 308 and the message headers may be changed to reflect the input message.
Use Case #7—Bulk Message Sent
When an identical MMS message is sent to multiple destination devices, it will be adapted only once per type of device. The adapted versions (without the MMS headers, just the bodies) will be stored in the cache to be reused for other targets using the same type of device. This is similar to the use case #2 above.
Use Case #8—Adding New Components to the Original Message
If the original message is known to be an advertising message which contains elements to encourage the forwarding of the message, and when the transcoding platform adapts a forwarded message which contains new or additional elements compared to the original message, the original message can be retrieved from the media cache and the additional components may be added to it before processing the adaptation. The "encouraging" of messages may occur when a Mobile Operator (in collaboration with $3^{rd}$ party companies/providers that want to send advertising messages) offer rewards to subscribers to forward the advertising MMS messages they receive. A subscriber may modify such messages, and a modified message can be forwarded, but the missing, removed, or modified parts of the original MMS message may be re-added in order to protect the integrity of the original message while also keeping the new content that was added by the forwarder.

Figure 4:
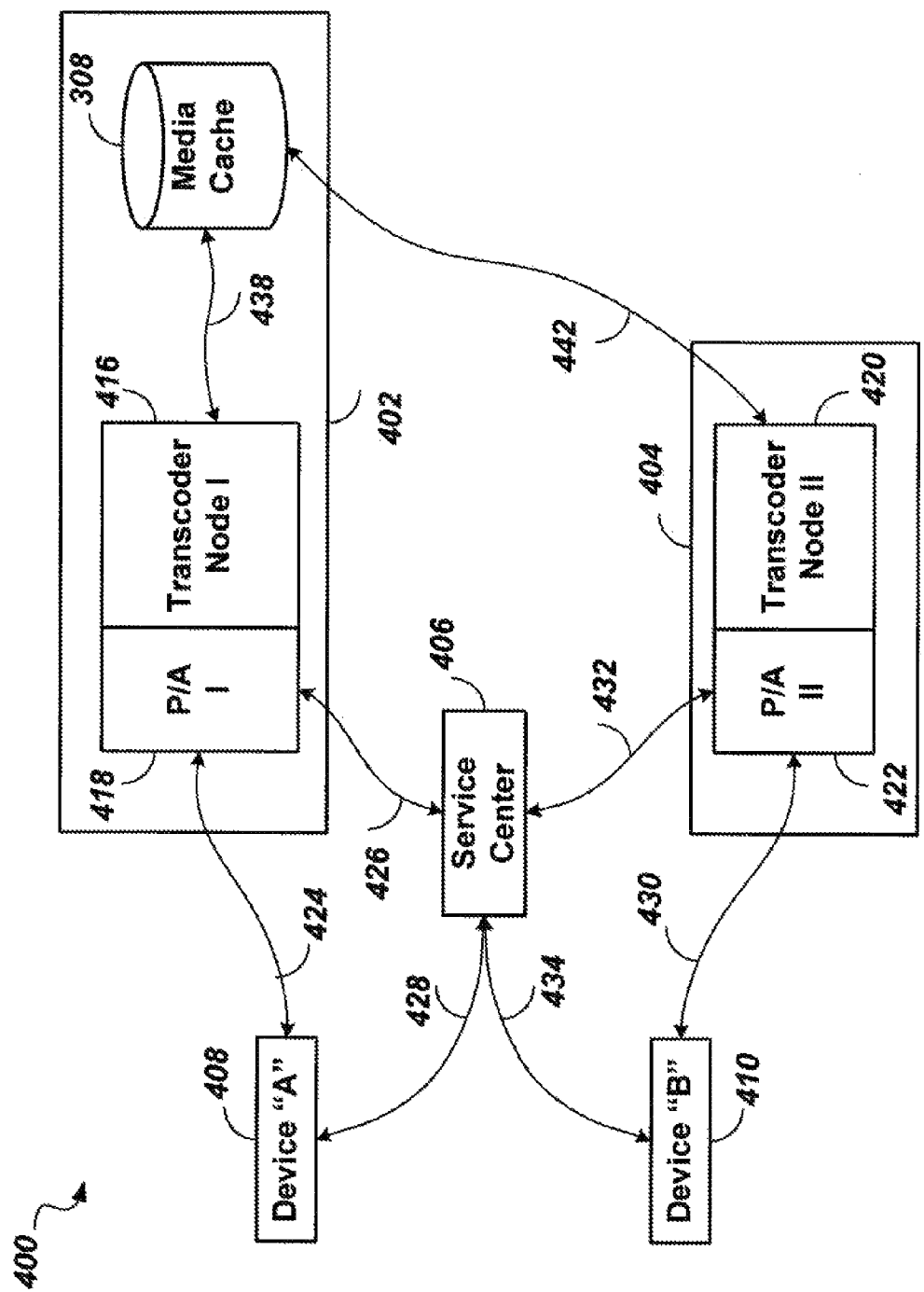
FIG. 4 illustrates a Generic System Diagram 400 of an embodiment of the present invention.
Figure 5:
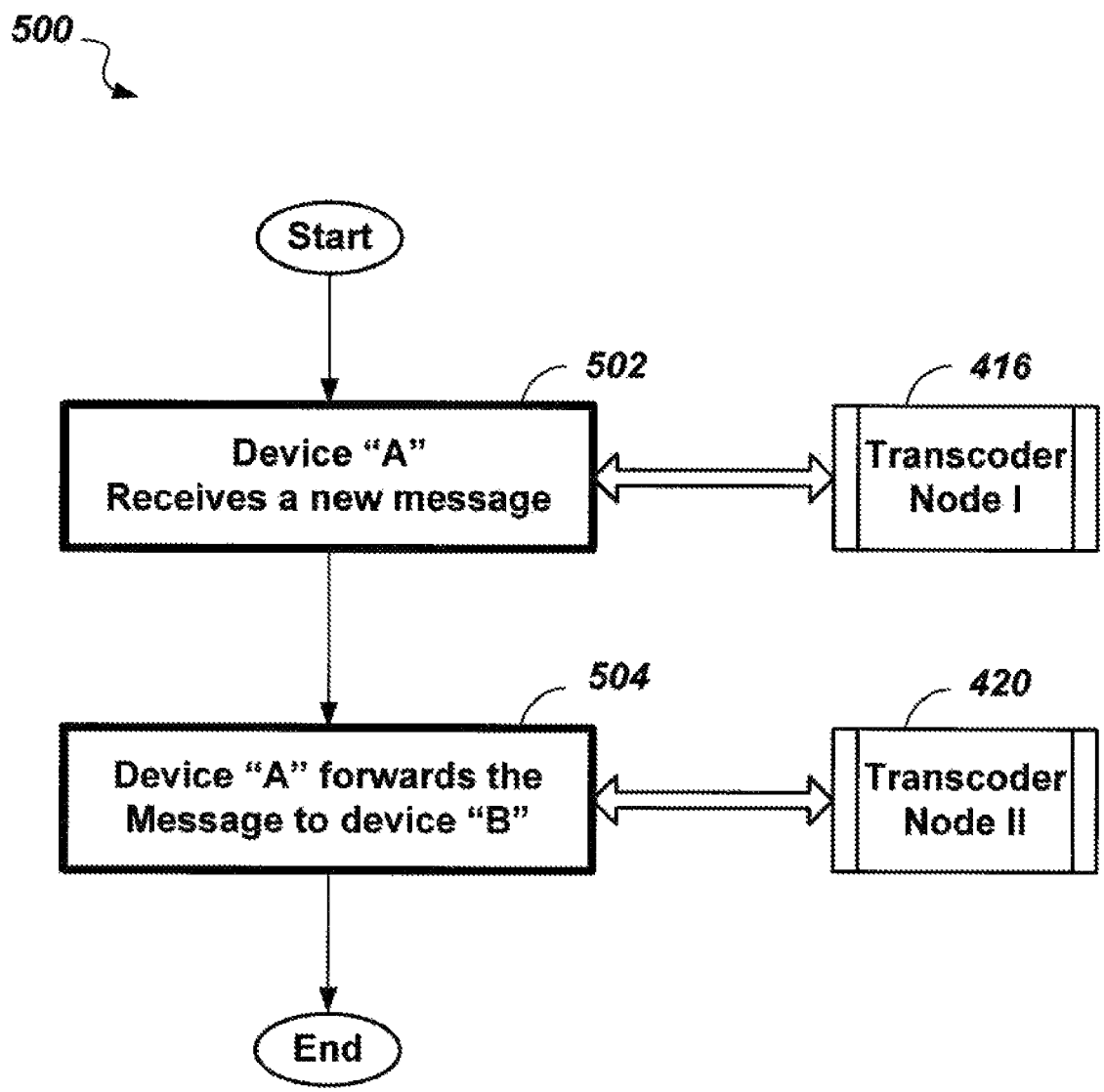
FIG. 5 is a flowchart 500 of a Generic Use case applied to the Generic System 400 of FIG. 4.

A Generic Use Case for forwarding an adapted message is described in the following with the help of a system diagram (FIG. 4) and a flow chart (FIG. 5).

FIG. 4 illustrates a Generic System Diagram 400 for use in describing the Generic Use Case that includes steps of processing a first message that is adapted for a first destination "A" and its subsequent forwarding to a second destination "B".

The Generic System Diagram 400 includes first and second Adaptation Servers 402 and 404; the Media Cache 308 (see FIG. 3); a Multi Media Service Center (Service Center) 406; a first Device "A" 408; and a second Device "B" 410.

The first Adaptation Server 402 includes a first Transcoder Node "I" 416 providing adaptation functionality, and a first Protocol Adaptor (P/A) "I" 418. Correspondingly, the second Adaptation Server 404 includes a second Transcoder Node "II" 420 and a second Protocol Adaptor (P/A) "II" 422. The Media Cache 308 is preferentially located within the first Adaptation Server 402. Alternatively, the Media Cache 308 may be located within the second Adaptation Server 404, or elsewhere, for example in an independent storage server (not shown).

The first and second Protocol Adaptors P/A "I" 418 and P/A "II" 422 may provide implementations of the MM1 specification as defined by the 3GPP in TS 23.140, on 3GPP organization at http://www.3gpp.org/ftp/Specs/html-info/23140.htm; other protocols may also be implemented and are within the scope of the invention, such as: STI (Standard Transcoding Interface) described in the Open Mobile Alliance document OMA-AD-STI-V1_0-20270515-A "Architecture of the Environment using the Standard Transcoding Interface" Approved Version 1.0—15 May 2007 cited above;

MM3 (Multimedia Messaging interface version 3) defined by the 3GPP in TS 23.140, on 3GPP organization at http://www.3gpp.org/ftp/Specs/html-info/23140.htm, and MM4 (Multimedia Messaging interface versions 3 and 4) defined by the 3GPP in TS 23.140, on 3GPP organization at http://www.3gpp.org/ftp/Specs/html-info/23140.htm; MM7 (Multimedia Messaging interface version 7) defined by the 3GPP in TS 23.140, on 3GPP organization at http://www.3gpp.org/ftp/Specs/html-info/23140.htm; ICAP (Internet Content Adaptation Protocol) described in Request for Comments (RFC) 3597 available from http://www.ietf.org/rfc/rfc3507.txt, and also at ICAP Forum at http://www.i-cap.org/; and EAIF (External Application Interface), see "Internet Content Adaptation Protocol" document cited above, which is an interface specific to a Multimedia Messaging Service Centre manufactured by the Nokia Corporation, see reference for EAIF protocol available at http://www.forum.nokia.com/info/sw.nokia.com/id/d0ee4125-3879-4482-b55d-90e3afe17a31/Ext_App_Interface_FAQ.pdf.html.

However, these other protocol specifications may be used in different network architectures. In the architecture shown as a detailed example here, only MM1 is proxied to perform transcoding between the device and the Service Center. For STI, for example, any application can send transcoding requests, typically directly to a Service Center. The other protocol specifications cited above are used in different contexts than MM1 and are not reflected by the diagrams provided in the present example.

Message links between the elements of the Generic System Diagram 400 include:
- a link 424 between the first Device "A" 408 and the first P/A "I" 418;
- a link 426 between the first P/A "I" 418 and the Service Center 406;
- a direct link 428 between the first Device "A" 408 and the Service Center 406;
- a link 430 between the second Device "B" 410 and the second P/A "II" 422;
- a link 432 between the second P/A "II" 422 and the Service Center 406;
- a direct link 434 between the second Device "B" 410 and the Service Center 406;
- a link 438 between the first Transcoder Node "I" 416 and the Media Cache 308; and
- a link 442 between the second Transcoder Node "II" 420 and the Media Cache 308.

The links 424 to 442 may be implemented as conventional network links, including wireless network links, using network protocols such as HTTP to carry MMS messages and other messages as will be detailed below.

The Service Center 406 may be standard call control node providing basic messaging connection service between terminals, for example the first and second Devices "A" and "B" labeled by reference numerals 408 and 410 respectively. One example of the Service Center 406 may be the MMS server of a Mobile Operator system which may have multiple interfaces to serve devices as well as transcoding servers. The first and second Adaptation Servers 402 and 404 are examples of transcoding platforms offering functionally equivalent interfaces as the Service Center 406 for use as proxies in front of the Service Center 406.

The first and second Devices "A" and "B" (408 and 410) may be wireless devices such as multimedia mobile telephones (cell phones). But within the scope of the invention, each device is not necessary a cell phone, but may be any other type of handset, a regular computer, or even a television set. Each of the links 424, 426, 428, 430, 432, and 434 (linking the first and second Devices "A" and "B" with the Service Center 406 and the first and second Adaptation Servers 402 and 404) may accordingly be implemented as a wireless network link, a virtual link in the form of an Internet connection, or any other type of link that is supported by each individual device (the first and second Device "A" or "B" respectively).

The first Transcoder Node "I" 416 provides adaptation functionality in the first Adaptation Server 402, and communicates with the Media Cache 308 over the link 438. Similarly, the second Transcoder Node "II" 420 in the second Adaptation Server 404 communicates with the Media Cache 308 over the link 442.

FIG. 5 is a flowchart 500 of a Generic Use case applied to the Generic System 400 of FIG. 4. The flowchart 500 illustrates two steps of a typical scenario in which one user (the first Device "A" 408) receives a new original message (in the step 502: Device "A" 408 receives a new message) that needs to be adapted for his device, and subsequently forwards the message to another user (the step 504: Device "A" 408 forwards the message to Device "B" 410) which may be different type of device. In each step, the message may be adapted, and each adaptation request may be sent to a different transcoder node (in this example): the first Device "A" 408 sends the adaptation request to the first Transcoder Node "I" 416 in the first Adaptation Server 402, while the second Device "B" 410 sends the adaptation request to the second Transcoder Node "II" 420 in the second Adaptation Server 404. The steps 502 and 504 are expanded in the following figures.

Figure 6:
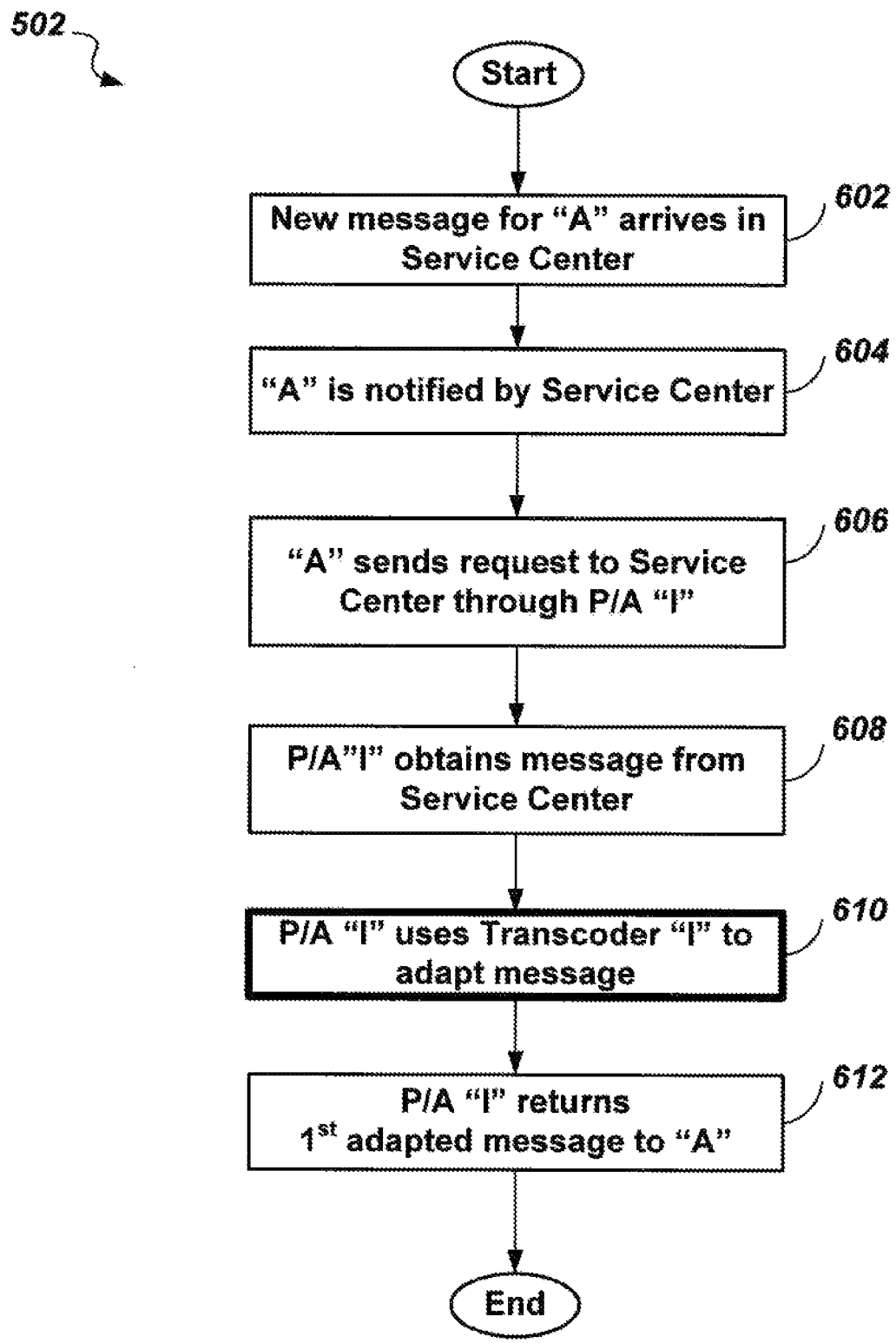
FIG. 6 is a flow chart expanding the step 502 (Device "A" 408 receives a new message) of FIG. 5.

FIG. 6 is a flow chart expanding the step 502 (Device "A" 408 receives a new message) of FIG. 5, into sequential steps:
step 602—New message for "A" arrives in Service Center;
step 604—"A" is notified by Service Center;
step 606—"A" sends request to Service Center through P/A "I";
step 608—P/A "I" obtains message from Service Center;
step 610—P/A "I" uses Transcoder "I" to adapt message; and
step 612—P/A "I" returns 1st adapted message to "A".

In the step 602 (New message for "A" arrives in Service Center) a new original message for the first Device "A" 408 is received by the Service Center 406.

In the step 604 ("A" is notified by Service Center), the Service Center 406 sends a notification to the first Device "A" 408 over the link 428 telling it that a new message is available for it.

In the step 606 ("A" sends request to Service Center through P/A "I") the first Device "A" 408 sends a request to the first Service Center 406 through the first P/A "I" 418 via the links 424 and 426, to get the new message.

In the step 608 (P/A "I" obtains message from Service Center) the (new) original message for the first Device "A" 408 is obtained by the first P/A "I" 418 from the Service Center 406 via the link 426. The original message is now available in the first Adaptation Server 402 which contains the first Transcoder Node "I" 416.

In the step 610 (P/A "I" uses Transcoder "I" to adapt message) the first P/A "I" 418 uses the first Transcoder Node "I" 416 to adapt the original message into a first adapted message. The step 610 is further expanded in FIG. 7 below.

Figure 7:
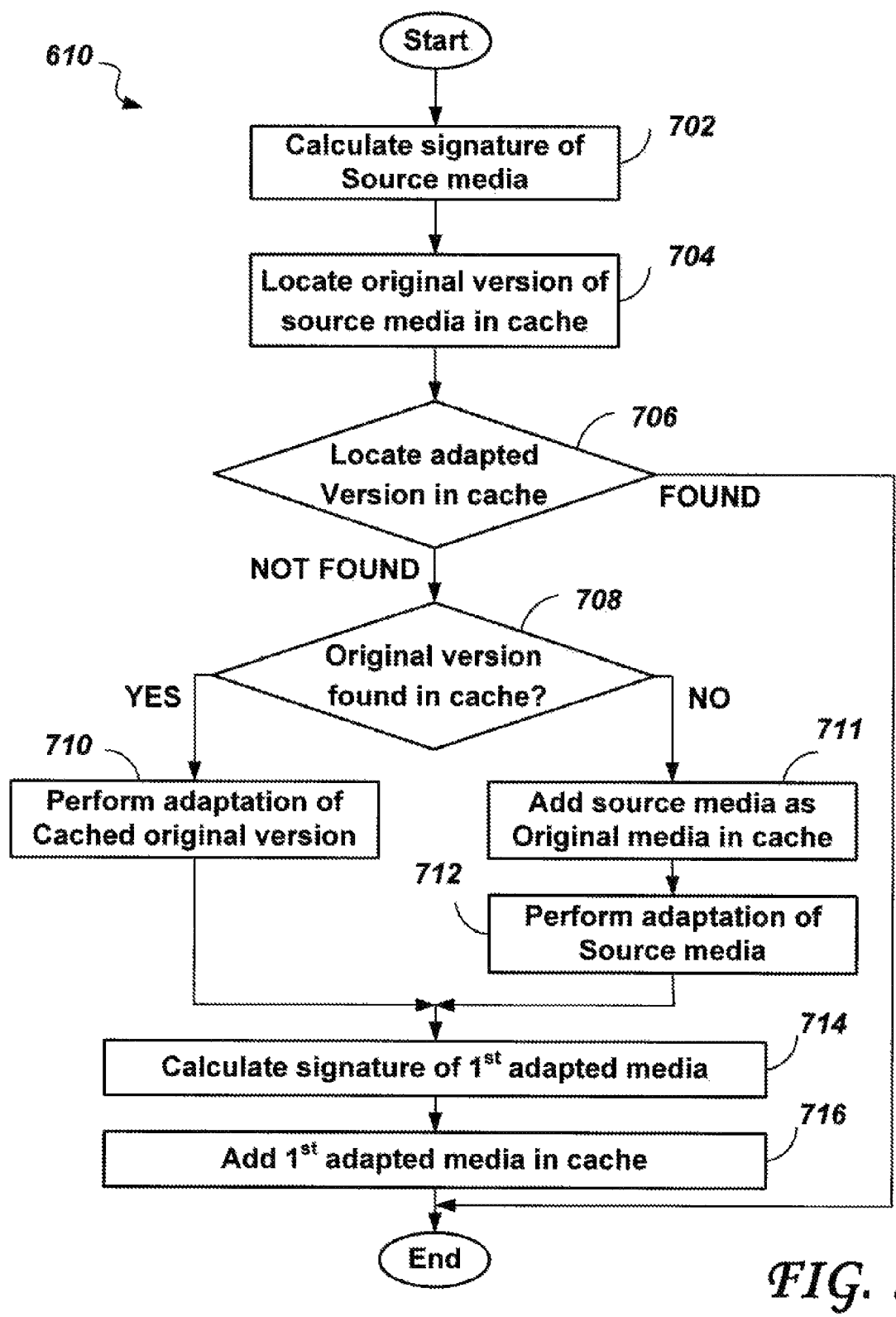
FIG. 7 is a flow chart expanding the step 610 (P/A "I" uses Transcoder "I" to adapt message) of FIG. 6.

FIG. 7 is a flow chart expanding the step 610 (P/A "I" uses Transcoder "I" to adapt message) of FIG. 6, into sequential steps:
step 702—"Calculate signature of source media";
step 704—"Locate original version of source media in cache";
step 706—"Locate adapted version in cache";
step 708—"Original version found in cache?";

step 710—"Perform adaptation of cached original version";
step 711—"Add source media as Original media in cache";
step 712—"Perform adaptation of source media";
step 714—"Calculate signature of 1st adapted media"; and
step 716—"Add 1st adapted media in cache.

Note that in adapting a multi media message, the media components of the message are of interest in the transformation or adaptation, and are collectively referred to in the following as "media file".

In the step 702 (Calculate signature of source media) the first Transcoder Node "I" 416 of the first Adaptation Server 402 uses the message from the Service Center 406 (step 608, FIG. 6) to calculate the unique signature of the source media file.

In the step 704 (Locate original version of source media in cache), and using the signature obtained in the step 702, the first Transcoder Node "I" 416 locates the original version of the media file in the Media Cache 308 (FIG. 4) via the link 438.

In the step 706 (Locate adapted version in cache), the first Transcoder Node "I" 416 attempts to locate a first adapted version of the media file specific to the targeted device (the Device "A" 408) in the Media Cache 308. If the first adapted version already exists ("FOUND"), the first adapted version of the media file is retrieved from the Media Cache 308 and the step 610 is complete (goto "End" in FIG. 7); processing then continues with the step 612 (FIG. 6). The first adapted version (if it exists) may be located in the Media Cache 308 by standard database techniques, for example by scanning a list of all adapted versions of the original version of the media file, stored in the Media Cache 308.

If the first adapted version of the media file is not found in the Media Cache 308 ("NOT FOUND" from the step 706), processing continues with the step 708.

In the step 708 (Original version found in cache?) the first Transcoder Node "I" 416 checks the result of the earlier step 704 (Locate original version of source media in cache) whether a cached copy of the original media file exists. If it already exists ("YES" from the step 708), this copy of the original media file is retrieved by the first Transcoder Node "I" 416 from the Media Cache 308 and will be used in the subsequent adaptation step 710 (Perform adaptation of cached original version).

If the result of the step 708 is "NO", i.e. the original version was not found in the cache, the source media file in the message that had been obtained from the Service Center 406 in the step 608 (FIG. 6 above) is stored into the cache as original media file in the step 711 (Add source media as original media in cache) and is adapted in the step 712 (Perform adaptation of source media).

In the steps 710 and 712 the first Transcoder Node "I" 416 thus adapts the cached original or the source media file respectively into the first adapted version of the media file according to:
the profile of capabilities of the first Device "A" 408;
the set of filtering rules (if filtering is required); and
any specified enhancement operations.

In the step 714 (Calculate signature of the 1st adapted media), the first Transcoder Node "I" 416 calculates the unique signature of the first adapted media file.

In the step 716 (Add 1st adapted media), the first Transcoder Node "I" 416 saves the first adapted media file with its key (i.e. the unique signature) in the Media Cache 308. Processing then continues with the step 612 (FIG. 6) described in the following.

Referring to FIG. 6 again, in the step 612 (P/A "I" returns 1st adapted message to "A"), the first adapted message (including the first adapted media file) is sent via the first P/A "I" 418 and the link 424 to the first Device "A" 408.

To summarize FIGS. 6 and 7, the first Device "A" 408, after notification from the Service Center 406 of an available original message, requests this message from the first P/A "I" 418 which acts as a proxy for the Service Center 406. The first P/A "I" 418 intercepts the request and eventually returns the first adapted message to the first Device "A" 408 after first looking for an existing copy of the original message to be adapted unless a suitably adapted message is already in the cache; if the original message is not found in the cache the available original message is adapted by the first Transcoder Node "I" 416.

Figure 8:
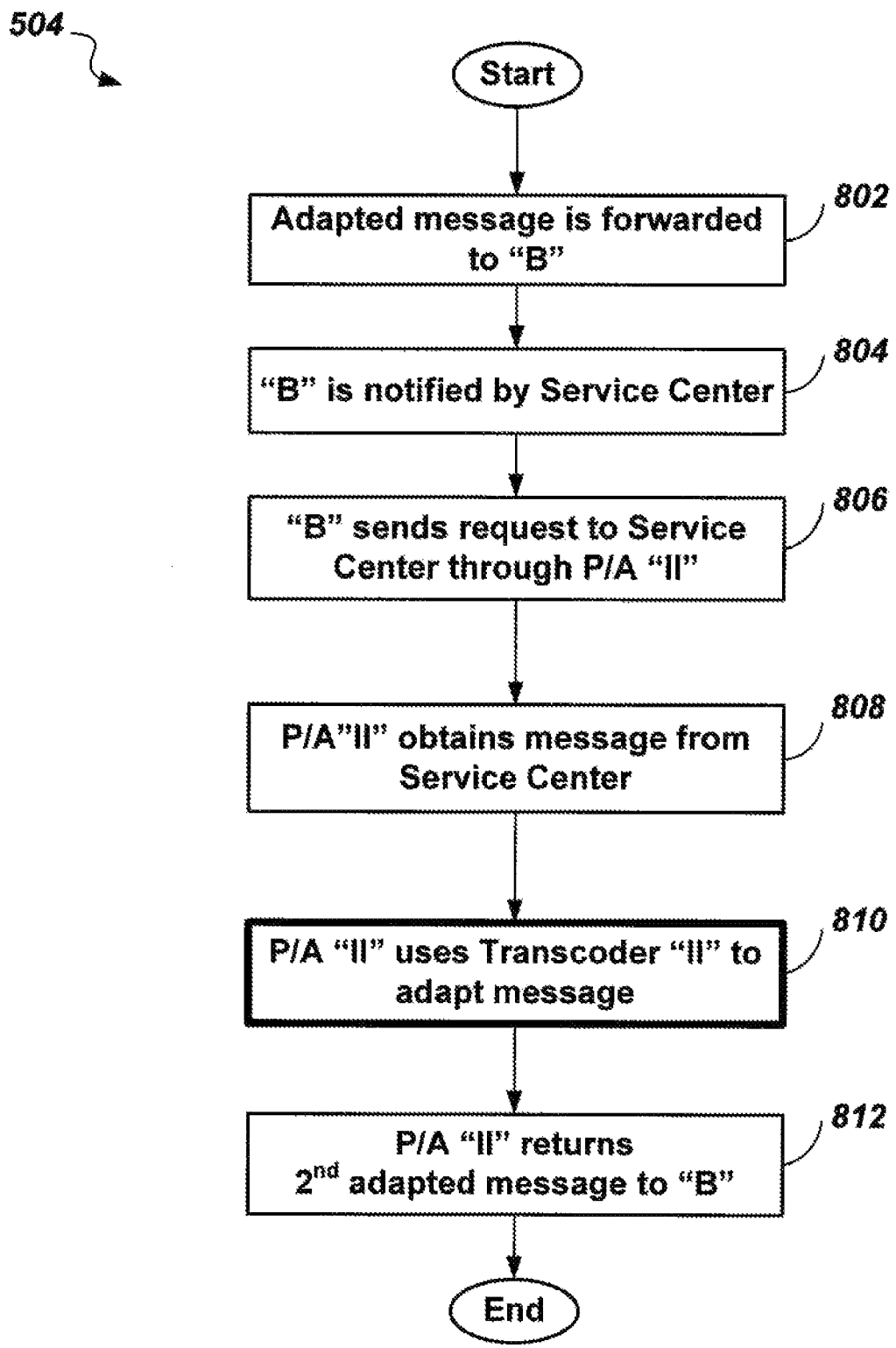
FIG. 8 is a flow chart expanding the step 504 (Device "A" forwards the adapted message to Device "B") of FIG. 5.

FIG. 8 is a flow chart expanding the step 504 (Device "A" forwards the message to Device "B") of FIG. 5, into sequential steps:
step 802—Adapted message is forwarded to "B";
step 804—"B" is notified by Service Center;
step 806—"B" sends request to Service Center through P/A "II";
step 808—P/A "II" obtains message from Service Center;
step 810—P/A "II" uses Transcoder "II" to adapt message; and
step 812—P/A "II" returns 2nd adapted message to "B".

In the step 802 (Adapted message is forwarded to "B"), the first Device "A" 408 forwards the first adapted message to another user (i.e. the second Device "B" 410) by sending it to the Service Center 406 via the link 428. Note that the second Device "B" 410 may be a different type of device than the first Device "A".

In the step 804 ("B" is notified by Service Center), the Service Center 406 sends a notification to the second Device "B" 410 over the link 434 telling it that a "new message" for it is available. This notification actually refers to the forwarded first adapted message, but as far as the second Device "B" 410 is concerned, it is simply a "new message".

In the step 806 ("B" sends request to Service Center through P/A "II") the second Device "B" 410 sends a request to the Service Center 406 through P/A "II" 422 via the links 434 and 432, to get the "new message".

In the step 808 (P/A "II" obtains message from Service Center) the new message for the second Device "B" 410 is obtained by the second P/A "II" 422 from the Service Center 406 via the link 432. This message is the first adapted message that was previously adapted for the first Device "A" 408, and is now being forwarded to the second Device "B" 410; it is now available in the second Adaptation Server 404 which also contains the second Transcoder Node "II" 420.

In the step 810 (P/A "II" uses Transcoder "II" to adapt message) the second Transcoder Node "II" 420 adapts the first adapted message into a second adapted message. The step 810 is analogous to the step 610 (P/A "I" uses Transcoder "I" to adapt message) and its sub-steps 702 to 708 described in FIG. 7. The step 810 is expanded in FIG. 9 below.

Figure 9:
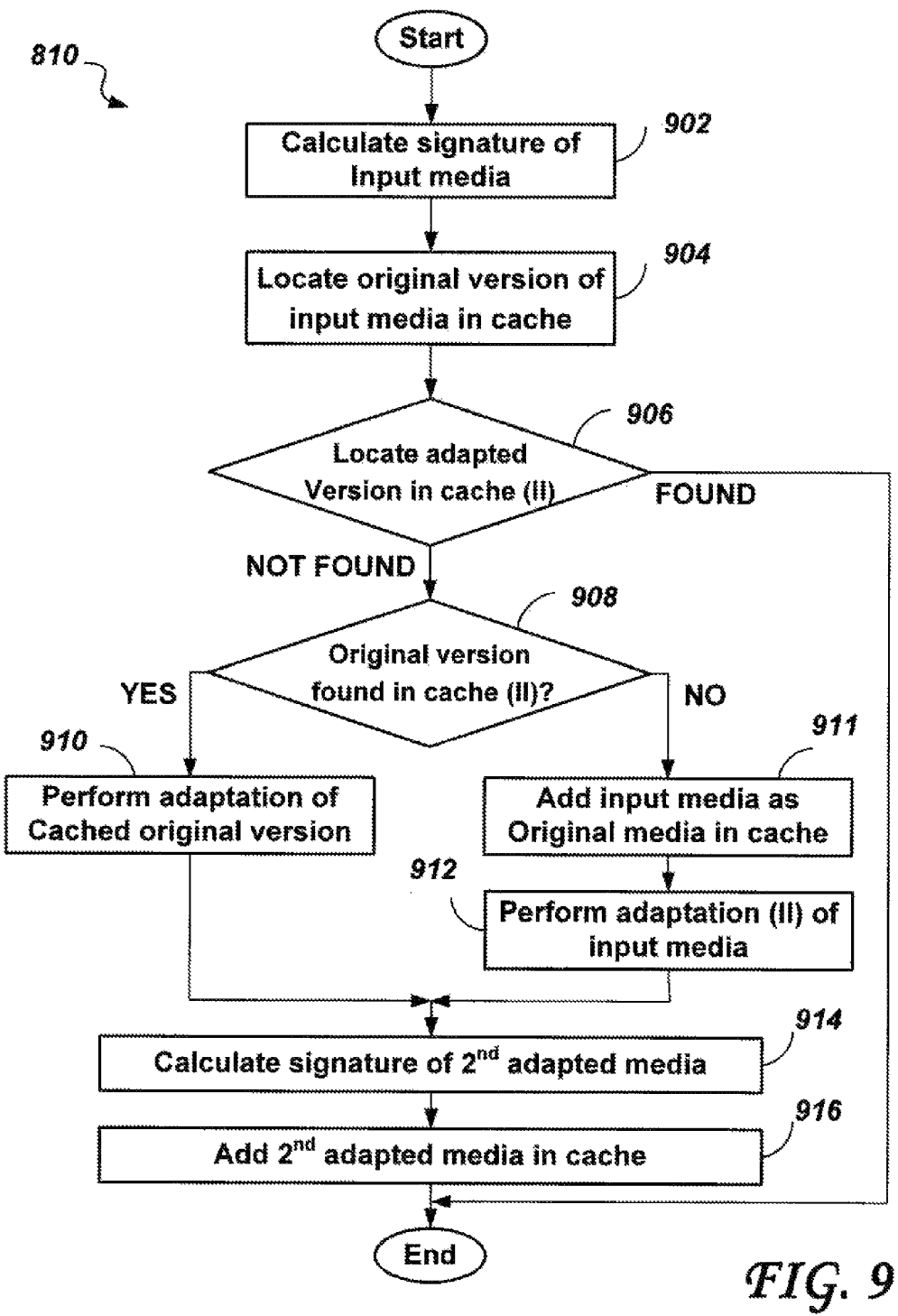
FIG. 9 is a flow chart expanding the step 810 (P/A "II" uses Transcoder "II" to adapt message) of FIG. 8.

FIG. 9 is a flow chart expanding the step 810 (P/A "II" uses Transcoder "II" to adapt message) of FIG. 8, into sequential steps:
step 902—"Calculate signature of input media";
step 904—"Locate original version of input media in cache";
step 906—"Locate adapted version in cache (II)";
step 908—"Original version found in cache (II)?";
step 910—"Perform adaptation (II) of cached original version";
step 911—"Add input media as original media in cache";
step 912—"Perform adaptation (II) of input media";
step 914—"Calculate signature of 2nd adapted media"; and
step 916—"Add 2nd adapted media in cache".

The steps 902 to 916 (sub steps of the step 810 P/A "II") uses the second Transcoder "II" to adapt the message. These steps are analogous to the steps 702 to 716 which are the sub steps of the step 610 (P/A "I" uses Transcoder "I" to adapt message), but are performed by the second Transcoder Node "II" 420 instead of the first Transcoder Node "I" 416.

In the step 902 (Calculate signature of input media) the second Transcoder Node "II" 420 of the second Adaptation Server 404 uses the message (the first adapted message) received from the Service Center 406 (step 808, FIG. 6) to calculate the unique signature of the input media file. This signature will be a key to locating the original media file in the media cache 308, i.e. the message before it was adapted into the first adapted message.

In the step 904 (Locate original version of input media in cache), using the signature obtained in the step 902, the second Transcoder Node "II" 420 locates the original version of the media file in the Media Cache 308 (FIG. 4) via the link 442.

In the step 906 (Locate adapted version in cache (II), the second Transcoder Node "II" 420 attempts to locate a second adapted version of the original media file specific to the targeted device (the Device "B" 410) in the Media Cache 308. If it already exists ("FOUND"), the second adapted version of the original media file is retrieved as the second adapted media file from the Media Cache 308 and the step 810 is complete (goto "End" in FIG. 9); processing then continues with the step 812 (FIG. 8). The second adapted version (if it exists) may be located in the Media Cache 308 by standard database techniques, for example by scanning a list of all adapted versions of the original version of the media file, stored in the Media Cache 308.

If the second adapted version of the original media file is not found in the Media Cache 308 ("NOT FOUND" from the step 906), processing continues with the step 908 following.

In the step 908 (Original version found in cache (II)?) the Transcoder Node "II" 420 checks the result of the earlier step 904 (Locate original version of input media in cache) whether a cached copy of the original media file exists. If it exists ("YES" from the step 908), this copy of the original media file is retrieved by the Transcoder Node "II" 420 from the Media Cache 308 and will be used in the subsequent adaptation step 910 (Perform adaptation (II) of cached original version).

If the result of the step 908 is "NO", i.e. the original version was not found in the cache, the input media file in the message that had been obtained from the Service Center 406 in the step 808 (FIG. 8 above) is stored into the cache as original media file in the step 911 (Add input media as original media in cache) and is adapted in the step 912 (Perform adaptation (II) of input media).

In the steps 910 and 912 the first Transcoder Node "I" 416 thus adapts the cached original or the source media file respectively into the second adapted version of the media file according to:

the profile of capabilities of the second Device "B" 410;
the set of filtering rules (if filtering is required); and
any specified enhancement operations.

In the step 914 (Calculate signature of 2nd adapted media), the second Transcoder Node "II" 420 calculates the unique signature of the second adapted media file.

In the step 916 (Add 2nd adapted media in cache), the second Transcoder Node "II" 420 saves the second adapted media file with its key (the unique signature) in the Media Cache 308. Processing then continues with the step 812 (FIG. 8) described in the following.

Referring to FIG. 8 again, in the step 812 (P/A "II" returns 2nd adapted message to "B"), the second adapted message (including the second adapted media file) is sent via the second P/A "II" 422 and the link 430 to the second Device "B" 410.

To summarize FIGS. 8 and 9, the second Device "B" 410, after notification from the Service Center 406 of an available input message, requests this message from the second P/A "II" 422 which acts as a proxy for the Service Center 406. The second P/A "II" 422 intercepts the request and eventually returns the second adapted message to the second Device "B" 410 after first looking for an existing copy of the original message that corresponds to the input message to be adapted unless a suitably adapted message is already in the cache; if the original message is not found in the cache the input message is adapted by the second Transcoder Node "II" 420.

It may be noted that both the steps 502 (Device "A" 408 receives a new message) and 504 (Device "A" 408 forwards the message to Device "B" 410) are expanded into two equivalent series of sub-steps. One series of sub-steps (the steps 602 to 612 and 702 to 714) represent the steps performed with respect to a newly received message destined for the first Device "A" 408. The other series of sub-steps (the steps 802 to 812 and 902 to 914) represent the steps performed with respect to a forwarded message destined for the second Device "B" 410. Both first and second Transcoder Nodes (416 and 420) access the same Media Cache 308 for storing and retrieving messages. Generally it is preferred to simply use a previously adapted version that is suitable for the target device type (if it is available in the cache), or adapt the original message if it is available.

In this generic example a single common cache, but two distinct adaptation servers are used. In alternative implementations, the cache may be distributed in a network of caches, and there may be any number of adaptation servers. For example, there may be a cache physically associated with one or more of the adaptation servers, and a distributed database scheme may be used that allows each of the adaptation servers to effectively access every one of the caches.

Furthermore, in this generic example, only one Service Center (406) is shown, acting as a multimedia server for MMS messages, and the Protocol first and second Adapters (P/A "I" and "II", 418 and 422 respectively) implement the MM1 protocol acting as proxy front ends for the Service Center. Alternatively, multiple Service Centers may be employed, the Service Centers may be configured as Multimedia servers, and the communications between the devices, the Service Centers, and the Protocol Adapters may be based on different protocols and conventions. For example, the direct links 428 and 434 between the devices and the Service Center(s) may not be required when the links 426 and 432 (between the Service Center and the first and second Adaptation Servers 402 and 404 employ the standard STI protocol (see "Architecture of the Environment using the Standard Transcoding Interface" document cited above) for obtaining transcoding services from the Adaptation Servers.

Keys and their Relationship with Media Files in the Media Cache

The unique key or signature of a media file is not enough to retrieve a message (for example an entire MMS message) or an adapted version of a media file or message. It is necessary to add additional information to differentiate them, and to keep the relationship between an adapted media file and its original version. We also need to keep track of the relationship between a message (i.e. an entire MMS message) and its components or parts.

In the current preferred embodiment of the invention, it has been found convenient to employ a relational database scheme (Relational Database System (RDBS) cited above, available from http://www.mysql.org/) for indexing and retrieving the media files, and to derive the unique keys from the contents of messages or data directly in the form of MD5 signatures (see Message Digest 5, specifications RFC1321 cited above). Other types of signatures may also be found to be effective as keys.

Original Media File

The unique key for an original media file, message, or message component may be generated fairly simply:
Single media file: MD5 signature of the entire media file;
MMS message: MD5 signature of the message's body without the main headers;
Message component: MD5 signature of the single media part of the message component, without the component-specific headers.

Adapted Media Files

An adapted media file is characterized by its unique signature, but it is also characterized by the signature of the parameters that were used to adapt it. Thus the unique key for an adapted media file is the combination of several MD5 signatures, for example,
Adapted single media file:
MD5 signature of the entire adapted media file;
MD5 signature of the profile used for transcoding;
MD5 signature of enhancement settings (such as clip merging, banner adding, etc.).
Adapted MMS message:
MD5 signature of the adapted message's body only, without the main headers;
MD5 signature of the profile used for transcoding;
MD5 signature of enhancement settings (clip merging, banner adding, etc.).
Adapted message component:
MD5 signature of the adapted single media part of the message component, without the component-specific headers;
MD5 signature of the profile used for transcoding;
MD5 signature of enhancement settings (clip merging, banner adding, etc.).

With the media cache to keep original messages and previously adapted messages available, the invention provides increased efficiency when adapted messages can be re-used rather than newly adapted, and improved quality when an adapted message is forwarded, by virtue of being able to readapt the original version for the forwarding target which may have higher display capabilities than the device from which the message is forwarded. The media cache of the invention, containing original media files and previously adapted versions thereof, along with the MD5 signatures of media files, transcoding profiles, and enhancement settings, facilitates the efficient retrieval of message components for the subsequent generation of forwarded messages.

Although the embodiment of the invention has been described in detail, it will be apparent to one skilled in the art that variations and modifications to the embodiment may be made within the scope of the following claims.

What is claimed is:

1. A method for caching and forwarding a multimedia message, comprising a message body having one or more media parts, the method comprising:
employing at least one hardware processor for:
determining a transcoding profile corresponding to capabilities of a destination device;
provided the message body matches a cached message body and the transcoding profile matches a cached transcoding profile:
retrieving the cached message body; and
forwarding the multimedia message comprising the retrieved cached message body to the destination device;
otherwise:
retrieving cached source media files, corresponding to those individual said one or more media parts for which cached media files are available but for which associated cached transcoding profiles do not match said transcoding profile;
transcoding the retrieved cached source media files into corresponding adapted media files in accordance with the transcoding profile;
generating an adapted multimedia message comprising an adapted message body having the adapted media files; and
forwarding the adapted multimedia message to the destination device.

2. An adaptation server for caching and forwarding a multimedia message, comprising a message body having one or more media parts, the adaptation server comprising:
at least one hardware processor; and
a non-transitory computer readable storage medium having computer readable instructions stored thereon for execution by the at least one processor, causing the at least one processor to
determine a transcoding profile corresponding to capabilities of the a destination device;
provided the message body matches a cached message body and the transcoding profile matches a cached transcoding profile:
retrieve the cached message body; and
forward the multimedia message comprising the retrieved cached message body to the destination device;
otherwise:
retrieve available cached source media files, corresponding to those
individual said one or more media parts for which cached media files are available but for which associated cached transcoding profiles do not match said transcoding profile;
transcode the retrieved cached source media files into corresponding adapted media files in accordance with the transcoding profile;
generate an adapted multimedia message comprising an adapted message body having the adapted media files; and
forward the adapted multimedia message to the destination device.

3. The method of claim 1, wherein the retrieving cached body comprises removing or modifying a media part of the message body.

4. The method of claim 1, wherein the generating comprises merging two or more media parts corresponding to two or more said retrieved cached media files or said adapted media files.

5. The method of claim 1, wherein the transcoding comprises storing the adapted media files in a cache, and the generating comprises storing the adapted message body in a cache.

6. The method of claim 1, wherein the determining comprises storing the transcoding profile in a cache.

7. The method of claim 1, further comprising generating respective unique keys for indexing cached source media files and adapted media files.

8. The method of claim 7, wherein a unique key characterizes a combination of a respective adapted media file and a corresponding transcoding profile.

9. The method of claim 7, wherein a unique key comprises a Message Digest 5 (MD5) signature.

10. The method of claim 1, wherein the multimedia message is a Multimedia Messaging System (MMS) message.

11. The adaptation server of claim 2, further comprising a cache for storing cached source media files and adapted media files.

12. The adaptation server of claim 2, wherein the processor is further configured to store the transcoding profile in a cache.

13. The adaptation server of claim 2, wherein the processor is further configured to store the adapted message body in a cache.

14. The adaptation server of claim 2, wherein the processor is further configured to remove or modify a media part of the message body.

15. The adaptation server of claim 2, wherein the processor is further configured to merge two or more media parts corresponding to two or more said retrieved cached media files or said adapted media files.

16. The adaptation server of claim 2, wherein the processor is further configured to generate respective unique keys for indexing cached source media files and adapted media files.

17. The adaptation server of claim 16, wherein a unique key characterizes a combination of a respective adapted media file and a corresponding transcoding profile.

18. The adaptation server claim 16, wherein a unique key comprises a Message Digest 5 (MD5) signature.

19. The adaptation server of claim 2, wherein the multimedia message is a Multimedia Messaging System (MMS) message.

20. A computer network, comprising the adaptation server of claim 2.

* * * * *